US007242825B2

(12) United States Patent
Lin et al.

(10) Patent No.: US 7,242,825 B2
(45) Date of Patent: Jul. 10, 2007

(54) CANTILEVER BEAM MEMS VARIABLE OPTICAL ATTENUATOR

(75) Inventors: Pinyen Lin, Rochester, NY (US); Yao Rong Wang, Webster, NY (US); Jun Ma, Penfield, NY (US); Xueyuan Liu, Webster, NY (US); Peter M. Gulvin, Webster, NY (US); Kristine A. German, Webster, NY (US); Joel A. Kubby, Rochester, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 11/010,769

(22) Filed: Dec. 13, 2004

(65) Prior Publication Data

US 2006/0127029 A1 Jun. 15, 2006

(51) Int. Cl.
*G02B 6/35* (2006.01)
(52) U.S. Cl. .......................................... 385/16; 385/140
(58) Field of Classification Search ................. 385/140, 385/16–24
See application file for complete search history.

(56) References Cited

U.S. PATENT DOCUMENTS

| | | | | |
|---|---|---|---|---|
| 5,078,514 | A | 1/1992 | Valette et al. ................. | 385/20 |
| 5,261,015 | A | 11/1993 | Glasheen ..................... | 385/23 |
| 5,612,815 | A | 3/1997 | Labeye et al. ............... | 359/320 |
| 5,848,206 | A | 12/1998 | Labeye et al. ................ | 385/22 |
| 5,864,643 | A * | 1/1999 | Pan ............................. | 385/22 |
| 6,102,582 | A * | 8/2000 | Espindola et al. ............ | 385/57 |
| 6,246,826 | B1 | 6/2001 | O'Keefe et al. ............. | 395/140 |
| 6,275,320 | B1 | 8/2001 | Dhuler et al. ................ | 359/237 |
| 6,658,178 | B2 * | 12/2003 | Kasuga et al. ................ | 385/19 |
| 2002/0172452 | A1 * | 11/2002 | Zhang et al. ................. | 385/18 |
| 2004/0184709 | A1 | 9/2004 | Kubby et al. ................. | 385/16 |
| 2004/0184710 | A1 | 9/2004 | Kubby et al. ................. | 385/16 |
| 2004/0184720 | A1 | 9/2004 | Kubby ......................... | 385/22 |
| 2004/0264907 | A1 * | 12/2004 | Lee et al. ..................... | 385/140 |

OTHER PUBLICATIONS

Pinyen Lin et al., U.S. Appl. No. 11/010,768, filed simultaneously herewith, titled "Methodology for a MEMS Variable Optical Attenuator".
Pinyen Lin et al., U.S. Appl. No. 10/995,965, filed Nov. 23, 2004, titled "Microfabrication Process for Control of Waveguide Gap Size".

* cited by examiner

*Primary Examiner*—Michelle R. Connelly-Cushwa
(74) *Attorney, Agent, or Firm*—Christopher D. Wait

(57) ABSTRACT

An improved cantilever beam optical switch design which provides the function of a variable optical attenuator (VOA). A small degree of intentional misalignment of the waveguide will create different levels of optical attenuation. By finely controlling the misalignment of a selected switched position, a single device may be realized that will provide the functions of both switching and attenuating or just attenuation alone. The optical MEMS device utilizes a latching mechanism in association with a thermal drive actuator for aligning a cantilever beam platform. The integration of the switching function and the VOA function reduce the optical loss which is otherwise unavoidable when the inevitable alterative of a separate switch and a separate VOA must necessarily be employed. The resultant improved device can also be applied for correcting the difference in optical intensity created by the manufacturing tolerances inherent in the fabrication of array waveguide gratings.

27 Claims, 18 Drawing Sheets

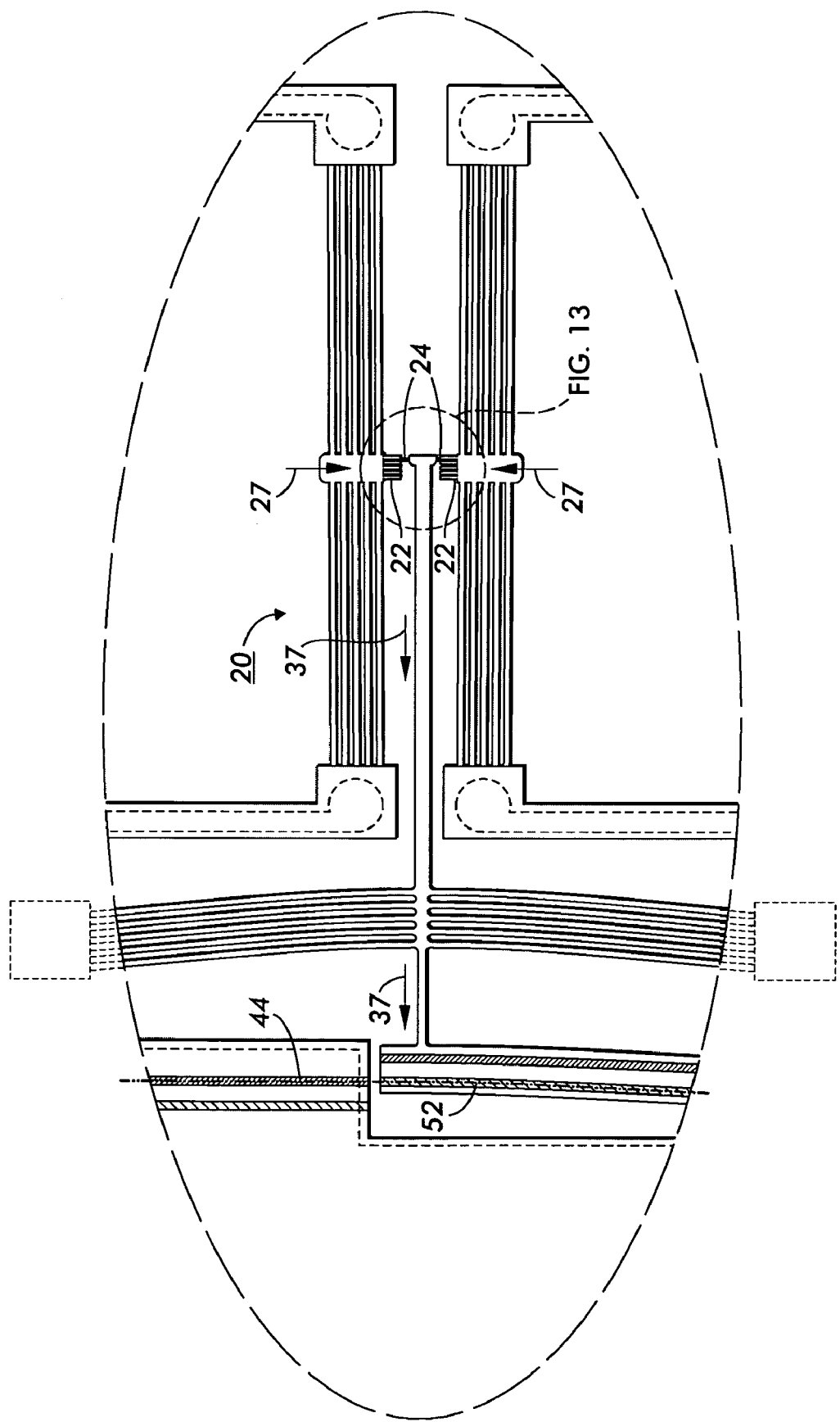

FIG. 13
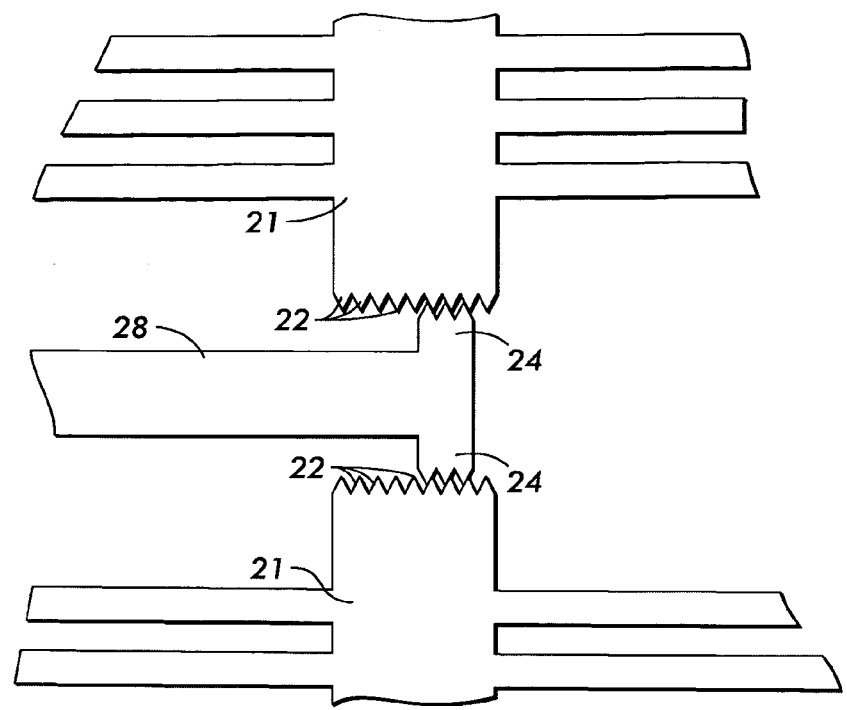
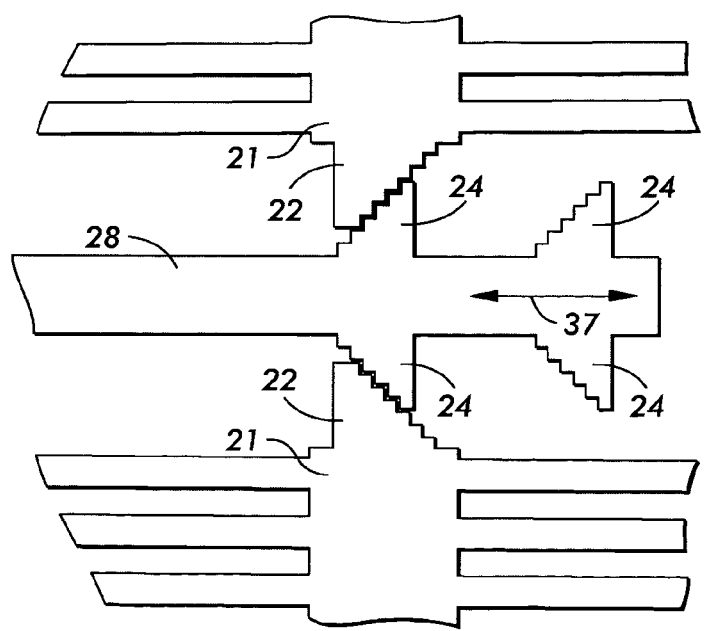
FIG. 14

CANTILEVER BEAM MEMS VARIABLE OPTICAL ATTENUATOR

CROSS-REFERENCE TO RELATED APPLICATIONS

Cross reference is made to the following application filed concurrently herewith and incorporated by reference herein: U.S. Publication No. 2006/0110101, published May 25, 2006, entitled "Methodology For A MEMS Variable Optical Attenuator". Attention is directed to copending applications U.S. Publication No. 2004/0184720, published Sep. 23, 2004, entitled, "MxN Cantilever Beam Optical Waveguide Switch", U.S. Publication No. 2004/0184709, published Sep. 23, 2004, entitled, "MEMS Waveguide Shuttle Optical Latching Switch", and U.S. Publication No. 2004/0184710, published Sep. 23, 2004, entitled,"MEMS Optical Latching Switch". Attention is further directed to U.S. Pat. No. 6,980,727, entitled "Microfabrication Process for Control of Waveguide Gap Size". The disclosure found in each of these copending applications is hereby incorporated by reference in its entirety.

BACKGROUND AND SUMMARY

The embodiments disclosed herein relate generally to micro-electro-mechanical system (MEMS) attenuators and more particularly to variable optical attenuators.

The telecommunications industry is undergoing dramatic changes with increased competition, relentless bandwidth demand, and a migration toward more data-centric network architectures. First generation point-to-point wave division multiplex systems have eased the traffic bottleneck in the backbone portion of a network. As a new cross-connect architecture moves the technology closer to the subscriber side of the network, operators are challenged to provide services at the optical layer, calling for more flexible networks that switch, attenuate and reroute wavelengths. This is placing great emphasis and demand for wavelength agile devices.

The need to provide services "just in time" by allocation of wavelengths, and further migration of the optical layer from the high-capacity backbone portion to the local loop, is driving the transformation of the network toward an all optical network in which basic network requirements will be performed in the optical layer.

The optical network is a natural evolution of point-to-point dense wavelength division multiplexing (DWDM) transport to a more dynamic, flexible, and intelligent networking architecture to improve service delivery time. The main element of the optical network is the wavelength (channel), which will be provisioned, configured, routed, attenuated and managed in the optical domain. Intelligent optical networking will be first deployed as an "opaque" network in which periodic optical-electrical conversion will be required to monitor and isolate signal impairments. Longer range, the optical network will evolve to a "transparent" optical network in which a signal is transported from its source to a destination entirely within the optical domain.

A key element of the emerging optical network is an optical add/drop multiplexer (OADM). An OADM will drop or add specific wavelength channels without affecting the through channels. Fixed OADMs can simplify the network and readily allow cost-effective DWDM migration from simple point-to-point topologies to fixed multi-point configurations. True dynamic OADM, in which reconfiguration is done in the optical domain without optical-electrical conversion, would allow dynamically reconfigurable, multi-point DWDM optical networks. This dynamically reconfigurable multi-point architecture is slated to be the next major phase in network evolution, with true OADM an enabling network element for this architecture.

On chip integration of optical switching and planar light circuits has the potential to greatly reduce the size and manufacturing costs of multi-component optical equipment such as Variable Optical Attenuators (VOAs). Current costs for Variable Optical Attenuators (VOAs) are significant, limiting their use to long-haul optical telecommunications networks. In order to extend their use into the metropolitan network the cost will need to be decreased by an order of magnitude without sacrificing performance.

One solution in particular to decreasing cost is through the integration of components, where the primary cost savings will be in packaging. A number of approaches are being pursued for optical integration using Planar Light Circuit (PLC) technologies. The majority of approaches use a silica-on-silicon platform with the VOA formed from the integration of silica Arrayed Waveguide Gratings (AWG's) for multiplexing and demultiplexing, with Thermo-Optic (TO) attenuators for performing the add/drop and pass of the demultiplexed signal. The use of a low-index contrast silica-on-silicon platform severely limits the yield of these components due to the requirement for uniform thick oxide films over large areas to form the waveguides. The use of TO attenuators limits the extensibility due to high-power requirements and thermal cross-talk.

A number of different materials and switching technologies are being explored for fabricating chip-scale photonic lightwave circuits such as AWG's for demultiplexers and multiplexers, Variable Optical Attenuators (VOA's) and Reconfigurable Optical Add-Drop Multiplexers (ROADMs). The main material platforms include silica wafers, silica-on-silicon substrates using both thin film deposition and wafer bonding techniques, polymer waveguides defined on silicon substrates, and silicon-on-insulator substrates. The main switching technologies include Mach-Zehnder interferometers based on either a thermo-optic or electro-optic effect, and MEMS mechanical waveguide switches and attenuators.

While silica waveguides have optical properties that are well matched to the optical properties of conventional single mode fibers, and thus couple well to them, they require thick cladding layers due to the low index of refraction contrast between the waveguide core and cladding materials, making them difficult to fabricate using planar processing techniques for fabrication and integration with other on-chip optical devices. The low index of refraction contrast, $\Delta n$, between core and cladding also requires large bending radii to limit optical loss during propagation through the photonic lightwave circuit, leading to large chip footprints and low die yields (<50%).

In addition, silica based waveguide attenuators are typically based on Mach-Zehnder interference using thermo-optic effects, that have a limited Extinction Ratio (ER) of around 25-30 dB, require significant power due to the low thermo-optic coefficient of silica, have problems with thermal cross-talk between the different optical channels and have a sinusoidal rather than a digital optical response.

What is needed is a Silicon-On-Insulator (SOI) platform for monolithically integrating optical, mechanical and electrical functions. The use of a silicon platform enables fabrication of components using the vast infrastructure and process development available for semiconductor IC manufacturing at silicon foundries. By fabricating the MEMS switches, attenuators and waveguides in the same material, single crystal silicon, there are no stress and strain issues as exist with heterogeneous materials sets such as silica-on-silicon. Fabrication in silicon also allows for integration with CMOS microelectronics for control and sensing capabilities, and for free-carrier plasma dispersion effects to enable signal leveling using integrated VOA's. The high index contrast of silicon (n=3.5) enables the ridge waveguide structures to make tight turns with minimum optical bending loss, decreasing overall chip size to centimeter dimensions.

An optical micro-electro-mechanical system (MEMS) combination cantilever beam optical switch and attenuator is herein disclosed below. In one embodiment the optical MEMS attenuator is used as an M×N optical signal switching system. The optical MEMS attenuator comprises a plurality of optical waveguides formed on a flexible cantilever beam platform for switching-optical states wherein the state of the optical attenuator is changed by a system of drive and latch actuators. The optical MEMS device utilizes a latching mechanism in association with a thermal drive actuator for aligning the cantilever beam platform. In use the optical MEMS device may be integrated with other optical components to form planar light circuits (PLCs). When attenuators and PLCs are integrated together on a silicon chip, compact higher functionality devices, such as Reconfigurable Optical Add-Drop Multiplexers (ROADMs), may be fabricated.

Disclosed in embodiments herein is a micro-electro-mechanical variable optical attenuator comprising a fixed optical waveguide and a movable optical waveguide which may be brought into substantial alignment with the fixed optical waveguide. The micro-electro-mechanical variable optical attenuator further comprises an actuator micro-incrementally misaligning the movable optical waveguide relative to the fixed optical waveguide and a latch that will hold the movable optical waveguide as micro-incrementally misaligned relative to the fixed optical waveguide by the actuator, in a manner such that any optical signal passing through the fixed optical waveguide and movable waveguide is attenuated.

Also disclosed in embodiments herein is a micro-electro-mechanical variable optical attenuator comprising a single optical gap, the single optical gap further comprising a fixed optical waveguide, and a movable optical waveguide, the movable optical waveguide being capable of being brought into substantial alignment with the fixed optical waveguide. The micro-electro-mechanical variable optical attenuator further comprises an actuator micro-incrementally misaligning the movable optical waveguide relative to the fixed optical waveguide, and a latch that will hold the movable optical waveguide as positionally micro-incrementally misaligned, relative to the fixed optical waveguide by the actuator, in a manner such that any optical signal passing through the single optical gap is attenuated.

Further disclosed in embodiments herein is a micro-electro-mechanical system optical switch with integral variable optical attenuator comprising two or more fixed optical waveguides and a movable optical waveguide which may be brought into substantial alignment with any of the two or more fixed optical waveguides. The micro-electro-mechanical system optical switch with integral variable optical attenuator further comprises an actuator for switching the movable optical waveguide to a selected one of the two or more fixed optical waveguides and further capable of micro-incrementally misaligning the movable optical waveguide relative to the selected one of the two or more fixed optical waveguides, and a latch that will hold the movable optical waveguide as micro-incrementally misaligned by the actuator, relative to the selected one of the two or more fixed optical waveguides, in a manner such that any optical signal passing through the single optical gap is attenuated by some variably desired amount.

BRIEF DESCRIPTION OF THE DRAWINGS

The drawings are not to scale and are only for purposes of illustration.

FIG. 12 is a top plane view showing an alternative latching mechanism in the latched position.

FIG. 13 is a close-up of the latch teeth mechanism as provided in FIG. 12.

FIG. 14 is a further alternative stair-step latch tooth mechanism.

DETAILED DESCRIPTION

The teaching as provided herein below provides for an improved cantilever beam optical switch design which provides the function of switching and also performs the function of a variable optical attenuator (VOA). After the optical switching of a movable waveguide associated with the cantilever beam optical switch, a small degree of intentional misalignment of the movable waveguide will create different levels of optical attenuation. By finely controlling the misalignment of a selected switched position, the device can thereby provide the functions of both switching and attenuating. This exemplary integration of the switching function and the VOA function also reduce the optical loss which is otherwise unavoidable when the inevitable alterative of a separate switch and a separate VOA must necessarily be employed. This improved device can also be applied for correcting the difference in optical intensity created by the manufacturing tolerances inherent in the fabrication of an array waveguide grating (AWG).

Figure 1:
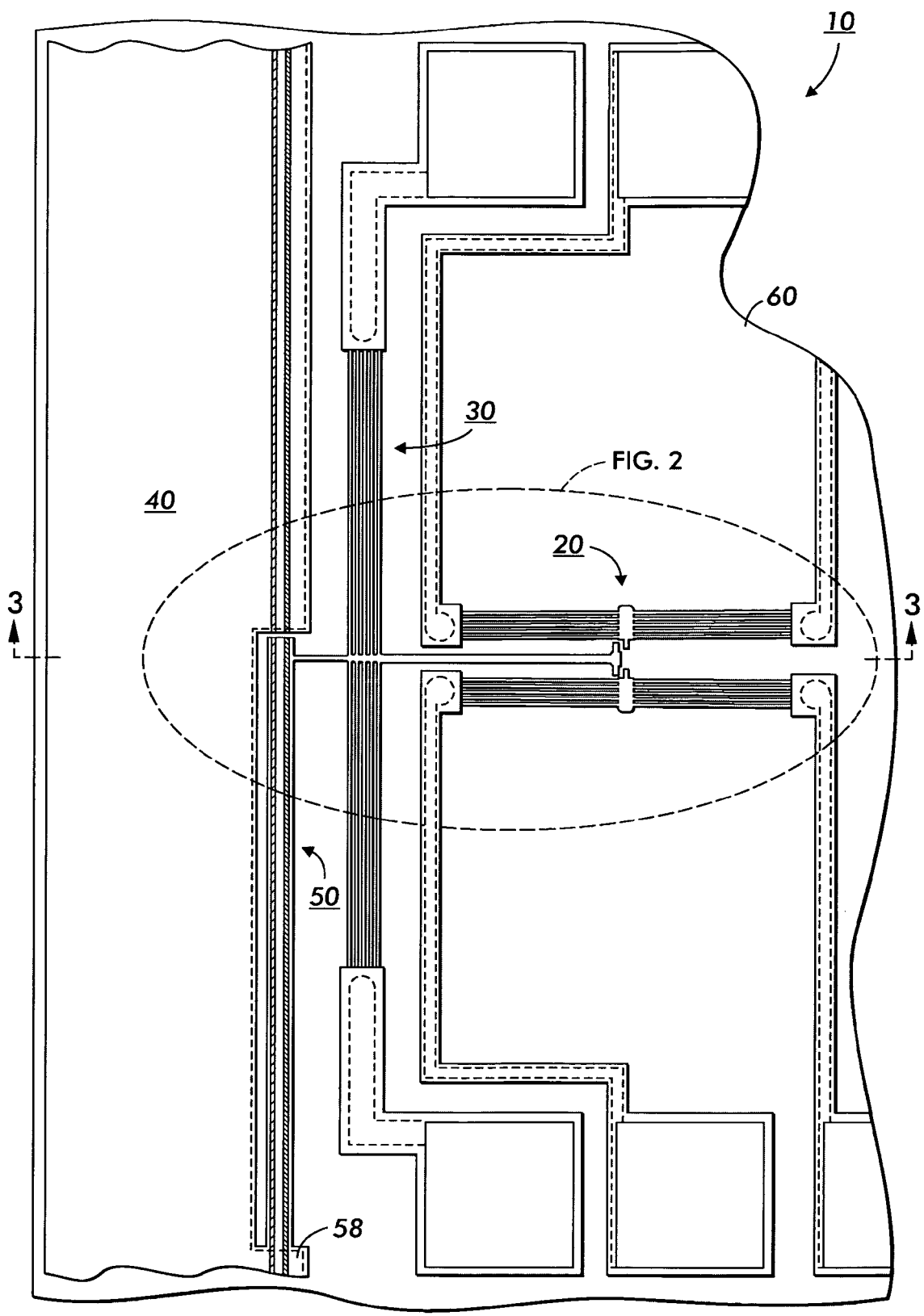
FIG. 1 is a cut away top plane view of an optical MEMS (Micro Electro Mechanical System) switch.

Referring now to FIG. 1 there is shown a top plane view of a variable optical MEMS (Micro Electro Mechanical System) attenuator 10. The variable optical attenuator is shown in one embodiment as a switch having moving mechanical components fabricated in a single-crystal silicon device layer of a SOI wafer using a self-aligned process. The variable optical MEMS attenuator 10 when in the form of a switch utilizes a latching mechanism 20 in association with a thermal drive actuator 30 for aligning a flexible cantilever beam platform 50 fixed at one end 58. The flexible cantilever beam defines one or more movable waveguides for switching to one or more stationary waveguides defined on an optical slab 40. The components fabricated in the device layer of an SOI wafer may be released by sacrificial etching of the buried oxide layer. In use the variable optical MEMS attenuator 10 may be integrated with planar light circuits (PLCs). When attenuators and PLCs are integrated together on a silicon chip, higher functionality devices, such as Variable Optical Attenuators (VOAs) may be fabricated.

Figure 2:
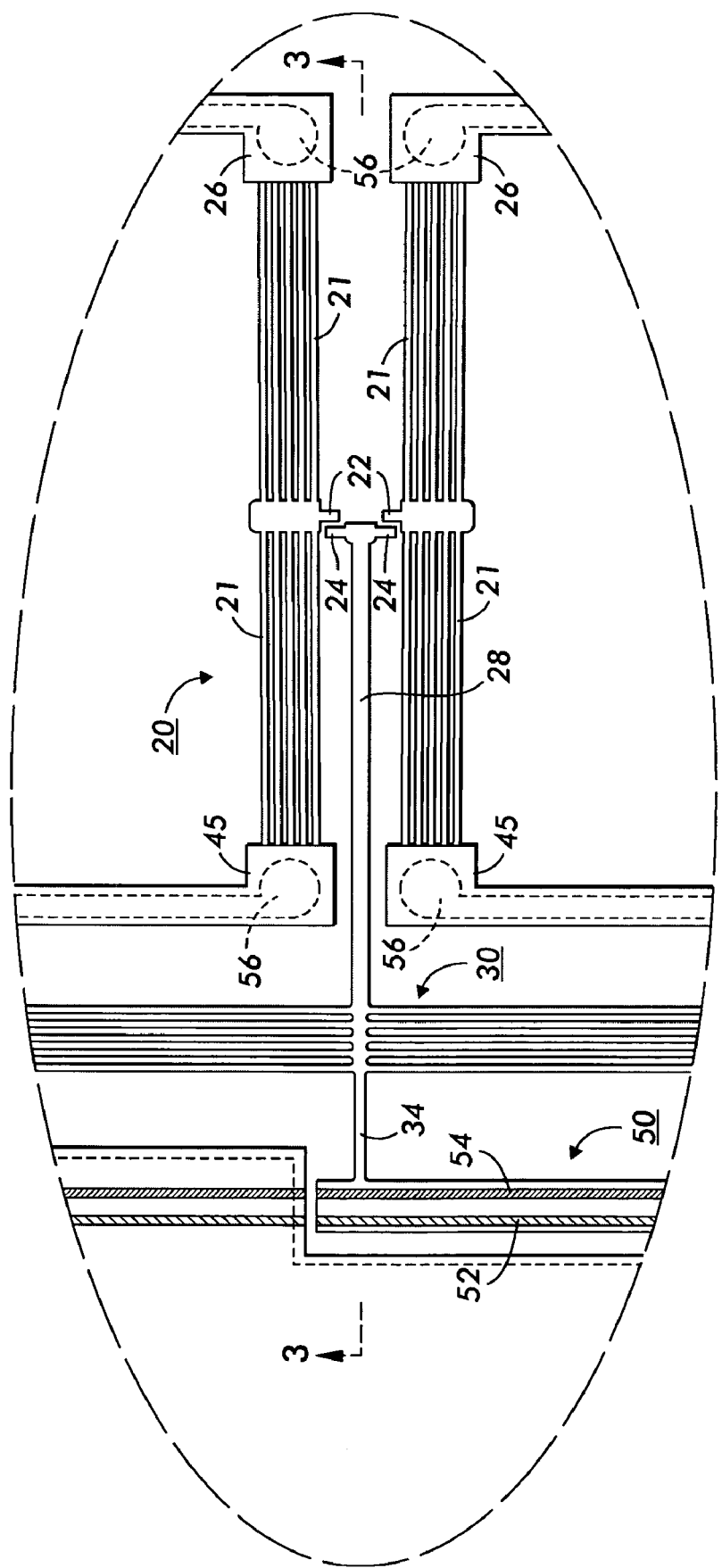
FIG. 2 is an enlarged view of a portion of FIG. 1 for illustrative purposes.
Figure 3:
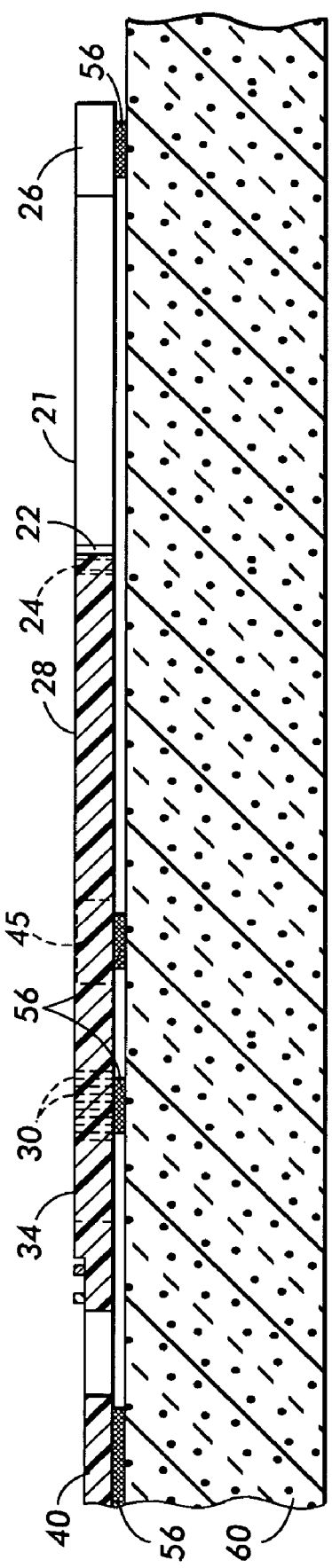
FIG. 3 is a side cross-sectional view of FIG. 2.

As shown in FIG. 1 through 3, the variable optical attenuator 10 comprises one or more thermal drive actuators 30 having associated during fabrication one or more thermal latch actuators 21, each thermal latch actuator 21 supports translating latch teeth 22. The flexible cantilever beam platform 50 defines a plurality of optical waveguides 52 and 54. A tether 34 connects the one or more thermal drive actuators 30 to the flexible cantilever beam platform 50. A linkage 28 connects the thermal drive actuators 30 to a set of linkage teeth 24 wherein the linkage teeth 24 are contacted by the latch teeth 22 when the latch is engaged. When the attenuator 10 is used as a switch, the linkage teeth 24 and latch teeth 22 are spatially located to determine one or more latched state positions wherein electrical stimuli is timed to actuate the thermal drive 30 and thermal latch actuators 21 so as to switch between equilibrium and latched states as will be more fully described below.

The optical MEMS attenuator 10 is applicable as a switch in a variety of applications, such as optical fiber transmission networks, to route optical signals along various signal paths. Switches are typically characterized by the number of input and output ports, referred to as M×N. For example, a 1×3 switch would switch one input between three outputs. M×N switches have previously been implemented using waveguide shuttles or by cascading a series of M 1×N cantilever switches. While shuttle switches can provide the M×N switching functionality, they require at least two gaps in the optical pathway, which leads to increased optical losses. Similarly, a series of M cascaded cantilever switches would have M optical gaps which leads to increased optical losses for M>1. By fabricating an M×N cantilever beam waveguide switch, where a cantilever beam carrying M waveguides is deflected rather than a waveguide shuttle, only one optical gap is required in the optical pathway, cutting the optical loss associated with propagation through the gaps in half. Alternatively M cantilever beams, each carrying a single waveguide, can be flexibly connected so that they all actuate together. Furthermore, reflections from the two gaps associated with a shuttle can cause additional losses due to interference.

Turning once again to FIG. 1 through 5 there is shown the variable optical attenuator 10 with two optical waveguides 52 and 54 formed on the flexible cantilever beam platform 50 for switching between two stationary optical waveguides 42 and 44, respectively. This configuration enables two optical signals to be switched at the same time. By including additional optical waveguides, additional signals may be switched simultaneously. The ability to switch multiple signals at the same time is important in many optical applications. For example, in an R-OADM (Reconfigurable Optical Add/Drop Multiplexer), when an input signal is dropped, a new signal can be added to the output. Since the add/drop function always occurs simultaneously, it is possible to decrease the number of required optical switch by implementing a single cantilever switch that performs the add drop function on both the input signal, sending it to the drop line, and the add signal, sending it to the switch's output. Referring to FIG. 3, the variable optical attenuator 10 uses oxide anchors 56 to attach components to the substrate 60. As well known in the art, polysilicon anchors can be utilized instead of oxide. Polysilicon can also be used to fabricate dimples, as commonly practiced in MEMS to avoid stiction.

Figure 4:
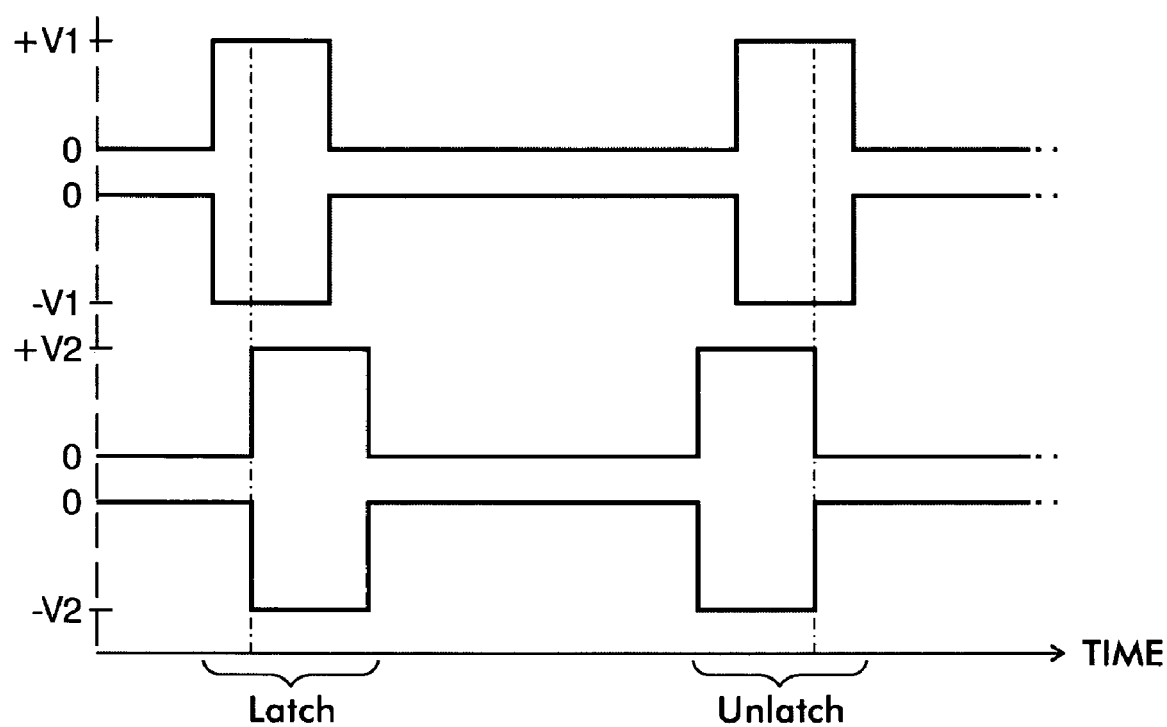
FIG. 4 is a graphically view of a timing diagram for controlling a latch and drive switch shown in FIGS. 1 and 2.
Figure 5:
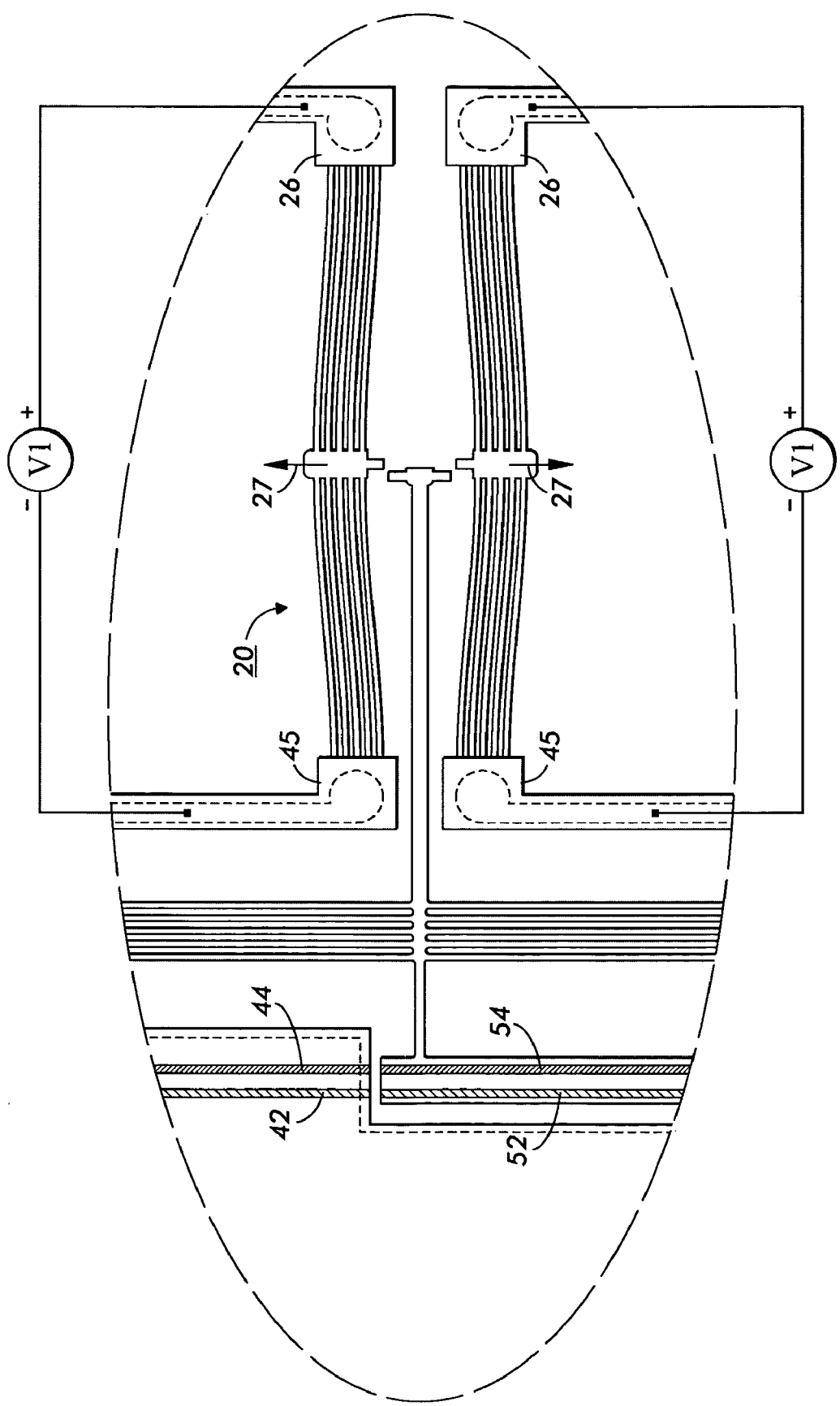
FIG. 5 is a top plane view showing the latch actuated to an open position.

Referring now to FIG. 4 there is graphically illustrated the timing sequence of the signals used to actuate the drive and latch mechanisms for the 2×2 attenuator illustrated in FIG. 1, where the voltages are labeled in FIG. 4 assuming the potential of the handle wafer or base substrate 60 is zero. The first portion of the timing diagram shows the latching sequence. The first step in the latching sequence is to apply a voltage +V1 to one end 26 of each latch actuator 21, and a voltage −V1 to the other end 45 of each latch actuator 21. The voltages on the latch actuators induce ohmic heating in the actuator beams, causing thermal expansion and the subsequent opening (direction 27) of the latch as shown in FIG. 5. While the latch actuator voltage is still applied, the drive actuator 30 is stimulated with a voltage +V2 at one end 31 and a voltage −V2 at the other end 33.

Figure 6:
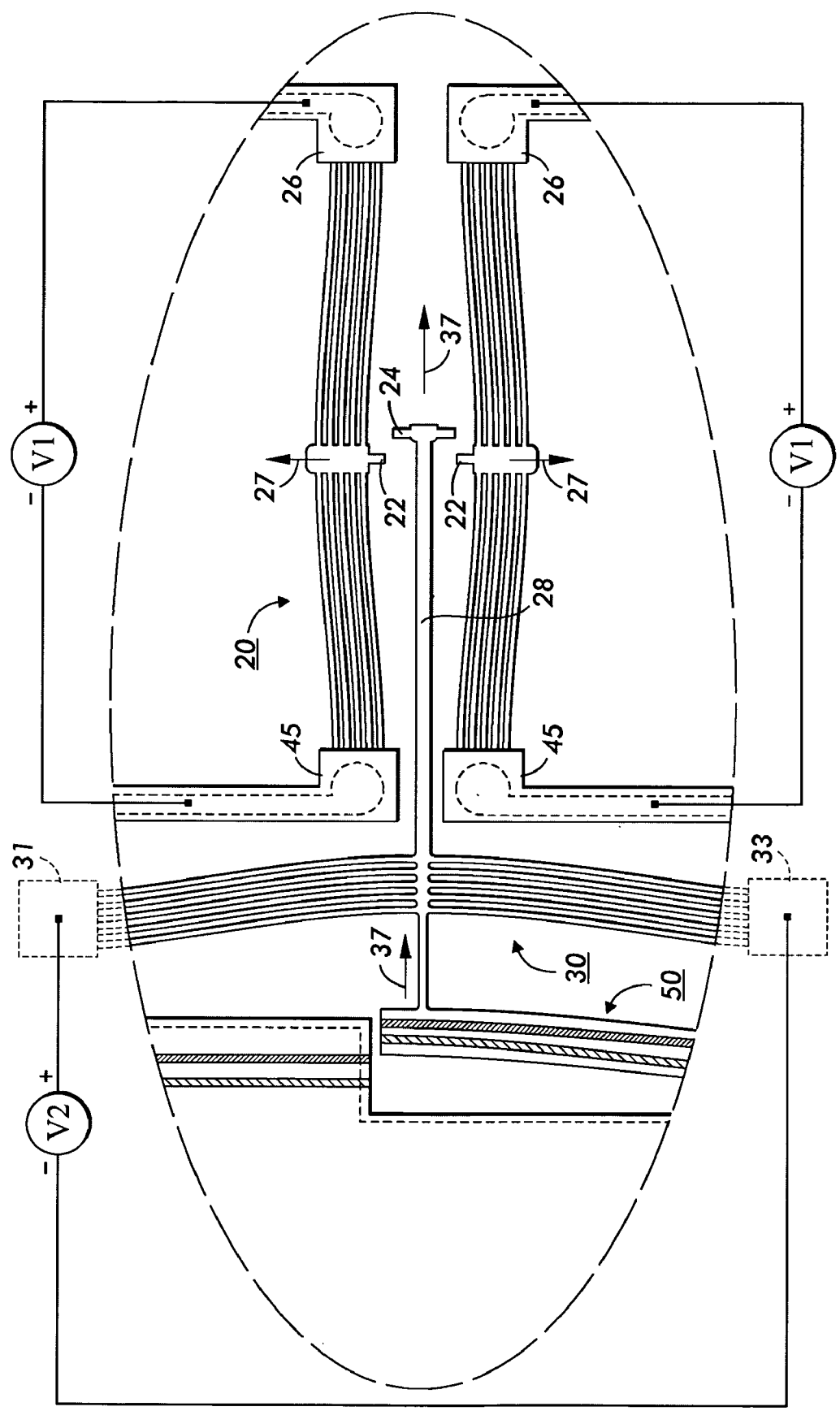
FIG. 6 is a top plane view showing the drive attenuator actuated to an overshoot position.
Figure 7:
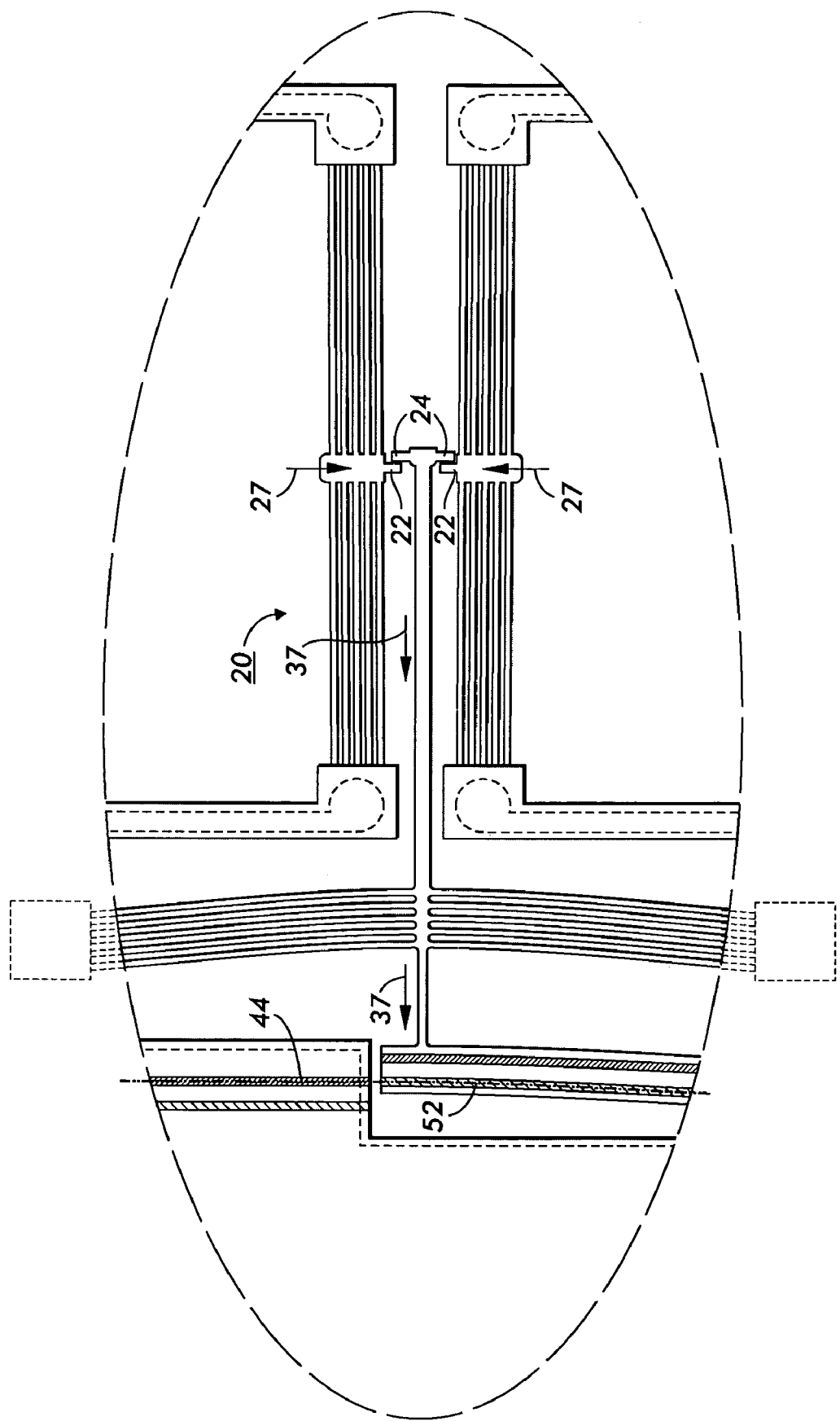
FIG. 7 is a top plane view showing the latching mechanism in the latched position.

FIG. 6 shows how the resulting thermal expansion of the drive actuator 30 is sufficient to move the flexible cantilever beam platform 50 and linkage 28 far enough to the right for the linkage teeth 24 to be well to the right side of the latch teeth 22. Next the latch actuator voltages return to zero, and the latch closes. To finish the latching sequence, the drive actuator voltages return to zero. As the drive actuator cools, the linkage teeth 24 are drawn in tension (direction 37) against the latch teeth 22 which holds the attenuator in the desired latched position as shown in FIG. 7. To return the attenuator to its original state, the same sequence of voltages are applied in the reverse timing, as shown in the unlatch portion of FIG. 4. Unlike attenuators with no latching capability, the optical MEMS latching attenuator 10 only consumes power during a change of state, and preserves its state or attenuation level, even if power is interrupted.

It should be noted that, although the timing diagram shown in FIG. 4 depicts square wave voltage pulses, this depiction is meant to be illustrative only of the basic timing, and does not preclude the use of other waveforms. Furthermore, the voltages applied to the thermal actuators need not be symmetric about zero. However, the use of equal but opposite polarity pulses, as described above, results in a constant zero voltage at the center of each actuator throughout the latch and unlatch cycle, which reduces electrostatic forces between the actuators and the handle wafer 60.

A logic table for the 2×2 switching function is as follows:

State One: Add/Drop function, as shown in FIG. 5
  The left movable waveguide 52 (input) is optically aligned to the left stationary waveguide 42 (drop).
  The right movable waveguide 54 (add) is optically aligned to the right stationary waveguide 44 (output).

State Two: Pass function, as shown in FIG. 7
  The left movable waveguide 52 (input) is optically aligned to the right stationary waveguide 44 (output).

In order to change from state one to state two, a force F can be applied by a thermal drive actuator 30. In order to deflect the free end by a distance δx, a force F must be applied where F is given by:

$$F=(Ea^3b/4L^3)\delta x$$

Where E is Young's modulus (E=1.65×10$^5$ μN/μm$^2$ for single crystal silicon), a is the thinner cross-sectional dimension of the beam 21, b is the thicker cross-sectional dimension of the beam and L is the length of the beam. For example, a 1000 μm long beam that is 5 μm thick and 20 μm wide would require a force of 13.2 μN to deflect the free end by 8 μm, which is sufficient deflection to an attenuator cantilever beam with two 4 μm waveguides.

The switching force F can be applied to the free end of the cantilever beam 50, or at an intermediate location, or locations as required. The attenuator can also be actuated in the opposite direction by applying a force F from the thermal drive actuator 30 in the opposite direction. In some cases it may be preferable to not use the equilibrium position of the cantilever beam, since these do not have a strong restoring force that returns them to this position since the cantilever beam may be quite long and flexible. Instead only deflected positions may be desirable to use. In addition, it may be advantageous to angle the receiving waveguides to better match the direction of propagation of the light leaving the deflected cantilever beam.

Since the cantilever beam carrying multiple waveguides could be wider than it is thick, it could suffer undesirable out of plane deflections since it is less stiff out of plane than it is in plane, as predicted by the formula:

$$K=(Ea/4)(b/L)^3$$

As an example, for a beam that is 5 μm thick and 20 μm wide, the ratio of the stiffness in the horizontal direction of the vertical direction is (20/5)$^2$. The beam is 16 times stiffer in the horizontal direction relative to the vertical direction.

In order to avoid out of plane deflections the appropriate location along the cantilever beam 50 may be attached to an attenuator tether 34 so as to minimize these out of plane deflections. The beam's width may also be decreased at certain points to decrease its stiffness in the horizontal direction (e.g. serrated). Joints can be added to make the beam more flexible in the horizontal direction. The beam can be deflected bi-directionally to decrease the magnitude of the required deflection. The beam can be thickened or stiffened to make it less flexible in the out-of-plane direction (e.g. by making the beam thicker or by adding super structures such as additional beams).

The attenuator waveguides are made together on a single crystal silicon wafer using widely available semiconductor processing equipment. Such on-chip integration avoids the complex alignment issues associated with manually connecting different and larger components with optical fibers, and avoids the cost and space associated with manufacturing, assembling and packaging the separate components of optical switches. On-chip integration with other components can drive down the cost of manufacturing attenuators and the installation of these complicated devices by a factor of ten or more.

Figure 8:
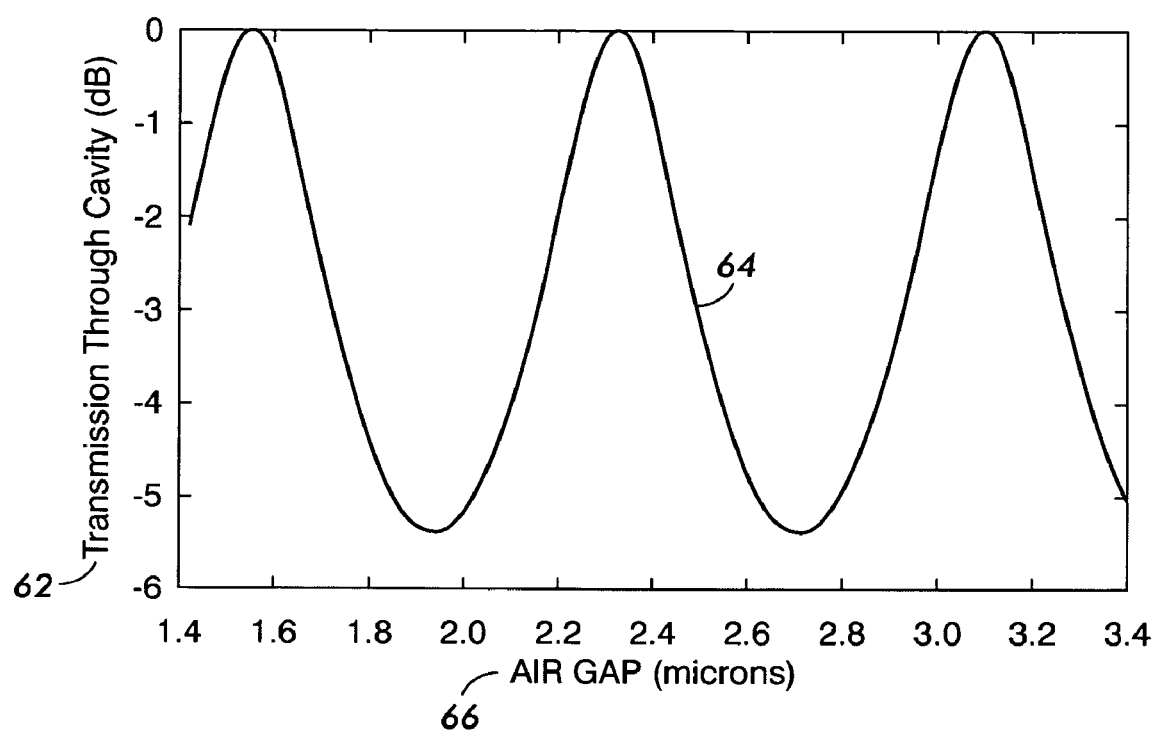
FIG. 8 is a graphical illustration of the transmission loss through the waveguide.

An embodiment for a cantilever beam MEMS as provided herein may comprise (1) M×N multiple waveguide optical attenuator with improved optical loss through the gap; (2) variable optical attenuator; (3) integrated optical switch that also functions as a variable optical attenuator. M×N multiple waveguide optical attenuator with improved optical loss through gap: The optical loss from the gap can be minimized by properly selecting the gap distance so that the Fabry-Perot resonant condition is satisfied. For a gap value, d, between two identical large planes with reflectivity R, the transmission coefficient is given by:

$$T = \left[1 + \frac{4R\sin^2 kd}{(1-R)^2}\right]^{-1}$$

where k is the wave vector of the light. The Fabry-Perot resonance condition is thus:

$$d=m\lambda/2$$

where m=1,2 . . . , and λ is the wavelength of the light. FIG. 8 shows that the optimal gap value dare 0.775 μm, 1.55 μm, 2.325 μm, 3.1 μm, 3.875 μm, 4.65 μm etc for λ=1.55 μm. The gap distance of 2.325 μm has less loss by as much as 5 dB compared to the gap distance of 1.9 μm or 2.7 μm.

Figure 9A:
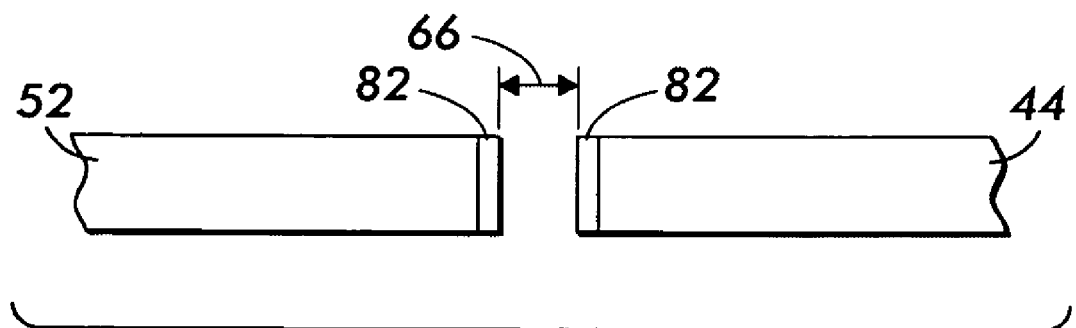
FIG. 9A is one embodiment illustrating an antireflection coating on a gap facet.
Figure 9B:
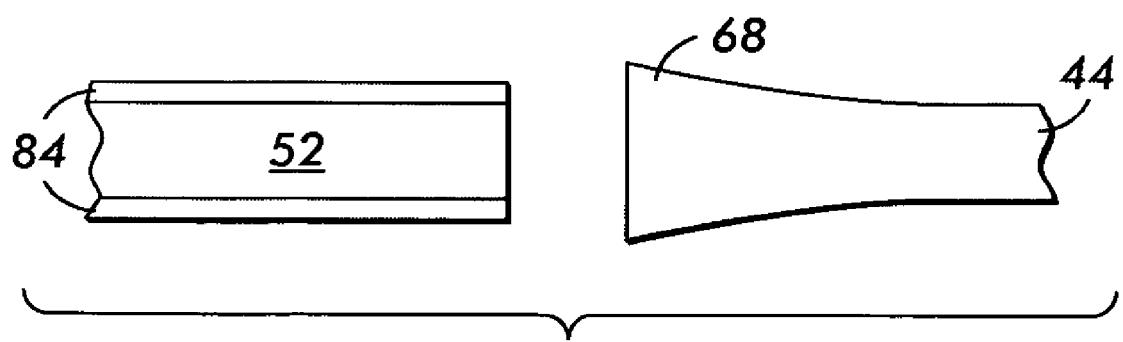
FIG. 9B is another embodiment illustrating an antireflection coating on a gap facet.

Other methods such as applying antireflection (AR) coating 82 on the gap facet can also reduce the transmission loss through the gap (FIG. 9A). Applying silicon oxide or silicon nitride coating 84 along the sidewall of the waveguide can also reduce the overall optical loss (FIG. 9B). Such techniques are exemplary for increasing the effective dynamic range of useful attenuation that may be realized in a combined Integrated optical switch also functioning as a variable optical attenuator as further described below.

Figure 10A:
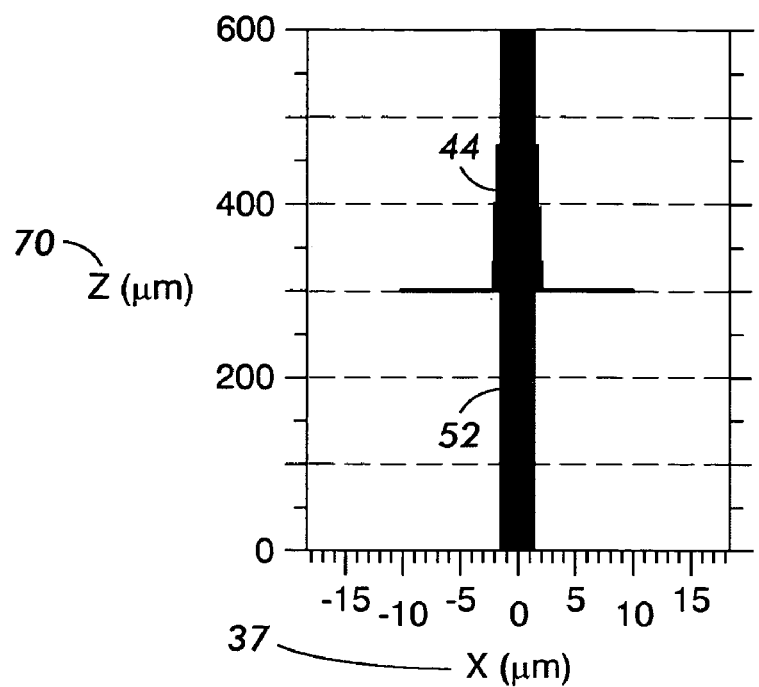
FIG. 10A is a graphical illustration representing a first distance misalignment of the waveguides.
Figure 10B:
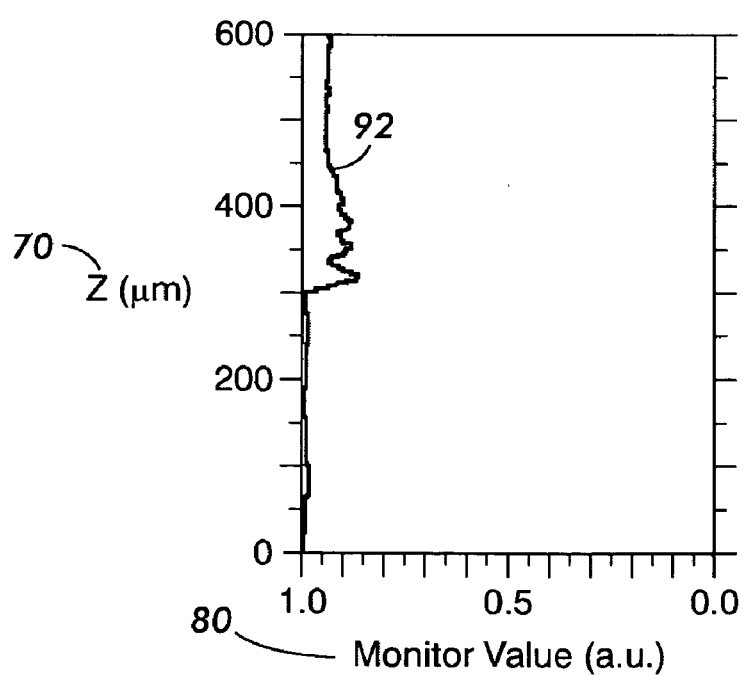
FIG. 10B is a graphical illustration representing the normalized optical attenuation values for the misalignment distance illustrated in FIG. 10A.
Figure 11A:
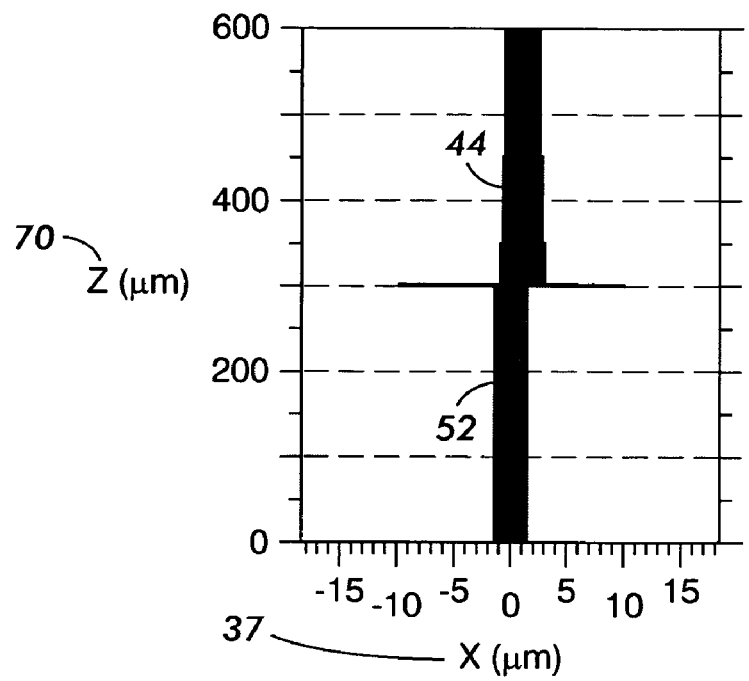
FIG. 11A is a graphical illustration representing a second distance misalignment of the waveguides.
Figure 11B:
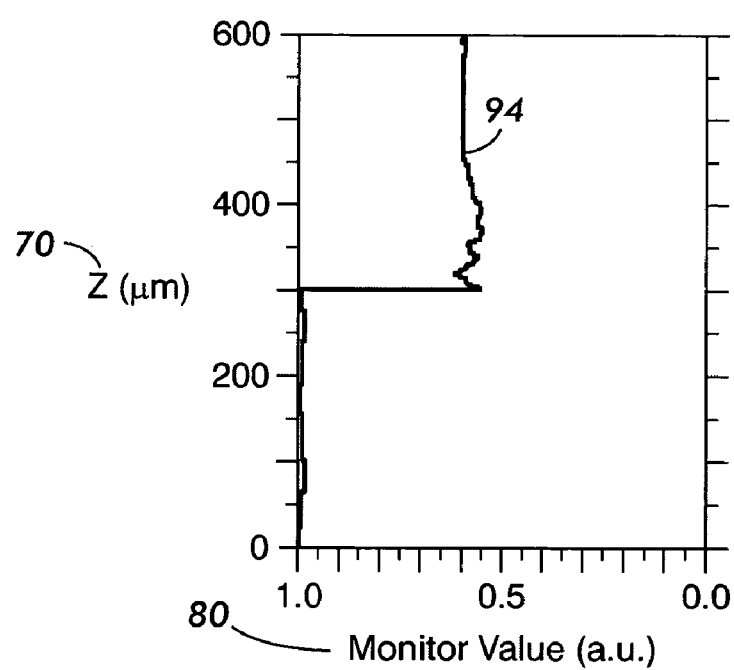
FIG. 11B is a graphical illustration representing the normalized optical attenuation values for the misalignment distance illustrated in FIG. 11A.

The simulation of light propagation through the cantilever beam waveguide and the gap is shown in FIGS. 10 and 11. The waveguide width is 3 μm and the air gap is 2 μm in this embodiment. FIGS. 10A & 10B graphical show the perfectly aligned cantilever beam waveguide geometries and resultant attenuation 92 respectively. FIGS. 11A & 11B depict the waveguide geometries and resultant attenuation 94 respectively for a purposely misaligned cantilever beam waveguide as misaligned by 1 μm. The optical loss 92 for the perfectly aligned waveguides is due to the air gap between the "in" waveguide 52 on the cantilever and the "Out" waveguides 44. Taper at the light-receiving waveguide 44 (width of 4 μm tapered to 3 μm over a distance of 200 μm in this study) is added for better optical coupling. The results clearly show that fine-tuning the misalignment could achieve the attenuation of the light intensity to the desired level.

FIG. 12 provides depiction of one embodiment for an Integrated optical switch functioning as a variable optical attenuator. Much here is as described for FIG. 7 above. However, here the linkage teeth 24 are provided with a plethora of latching teeth 22 with which they may be engaged. FIG. 13 provides a blow-up of the area of FIG. 12 depicting in an alternative embodiment, another differentiation here from the structure otherwise the same as that provided in FIG. 7. The saw-tooth linkage teeth 24 are smaller here so as to best mate with the similarly saw toothed latching teeth 22 so as to allow small micro-incremental displacement of linkage 28. By providing this small micro-incremental displacement of linkage 28 the movable optical waveguide 54 may be correspondingly micro-incrementally misaligned from the fixed stationary optical waveguide 44. It is these small micro-incrementally misalignments from fixed stationary optical waveguide 44 (relative the fully aligned position) which will provide correspondingly varying amounts of optical attenuation. By the term micro-incrementally misaligned, here, it is meant that the amount of misalignment is but a fractional part of the total waveguide width.

As will be evident to those skilled in the art, and in alternative to the depiction provided in FIGS. 12 and 13, the above methodology and arrangement may be applied with but a single fixed stationary optical waveguide 44 and a single movable optical waveguide 54 for a single optical gap, so that only the attenuation function is provided, and is thus absent the above described switching functionality.

The cantilever beam 52 and platform 50 may be actuated by MEMS actuators such as, but not limited to, heat actuators, electrostatic actuators, electromagnetic actuators, and piezoelectric actuators. Results of the cantilever beam bending by using a heat actuator shows that the tip of the cantilever beam 52 displaces 15.3 μm as the V-shape actuator is heated to 600° C. In some embodiments, this distance (15.3 μm) would be the total traveling distance as an optical switch. For useful function as a variable optical attenuator, the cantilever beam only needs to move 2 μm or less. Therefore, as 2 μm of misalignment can achieve the desired optical attenuation, the cantilever beam 52 and flexible cantilever beam platform 50 need only travel 13.3 μm to provide the function both a switch and a VOA together.

Various servo type approaches may be taken to effectuate this single optical gap and cantilever beam VOA. In an analog approach may provide a static voltage level representative of a desired attenuation level. A down stream sensor would then provide a voltage level as indication of attenuation. A voltage comparator upon comparison of these two levels would then provide a resultant closed loop control signal indicative of any need to readjust the micro-misalignment of the movable optical waveguide. Those skilled in the art will understand that this may just as easily be performed digitally under either hardwired or software control. The choice will typically reside in the system environment and chip hardware environment in which the VOA is employed.

FIG. 14 depicts an alternative embodiment for linkage teeth 24 and latching teeth 22 where a stair-step arrangement is provided on their respective mating faces. As thermal latch actuator 21 and thermal drive actuator 30 interoperate small micro-incremental displacements of linkage 28 may accordingly be latched in place. Additional linkage teeth 24 identically provided with the stair-step faces will be provided along linkage 28 corresponding for each stationary optical waveguide 42, 44, etc. for which switching coupled with attenuation is desired. If attenuation is not needed then a single plain rectangular tooth devoid of the stair-step mating faces need only be substituted. It should be noted that one specific latched position between the linkage teeth 24 and the latching teeth 22 is for straight alignment of waveguides 44 and 52. At this position there is no optical attenuation other than normal gap loss.

Figure 15:
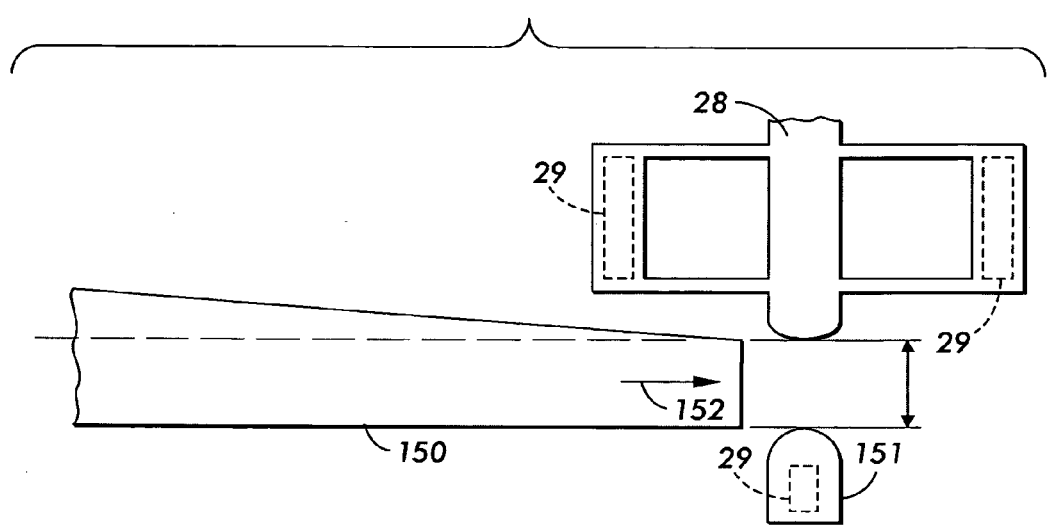
FIG. 15 depicts a wedge style actuator mechanism for micro-misalignment.
Figure 16:
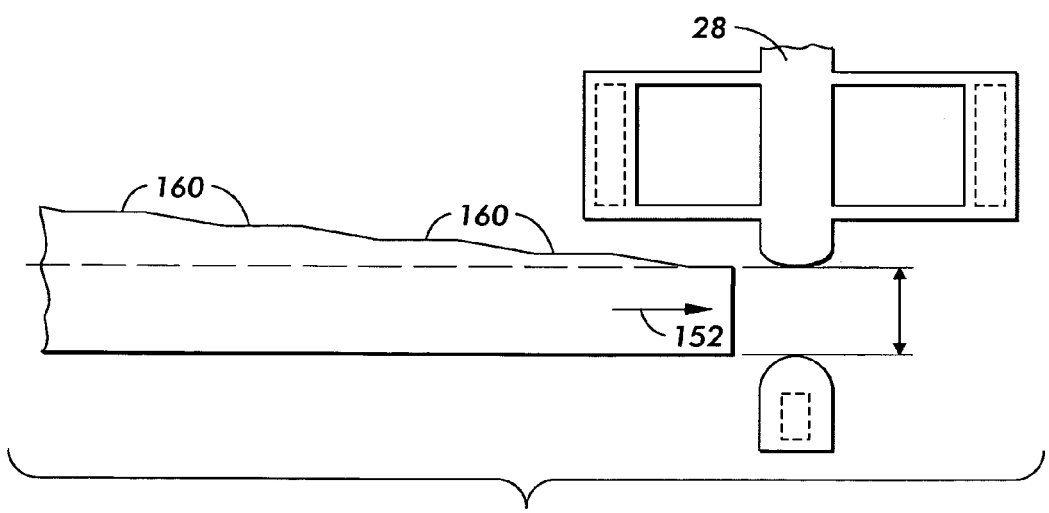
FIG. 16 depicts a stepped variant of the wedge style actuator mechanism for micro-misalignment in FIG. 15.

FIG. 15 provides yet another alternative embodiment for driving linkage 28 micro-incrementally. Wedge block 150 is driven by a thermal actuator between the tip of linkage 28 and a fixed pin 151 in direction 152. FIG. 16 provides an alternative to the infinitely variable embodiment of FIG. 15 by providing facets 160 which will give distinct incremental values of misalignment. The linkage 28 has anchors 29 to reduce the torque of the linkage 28 and to ensure the moving direction of the linkage 28 is perpendicular to the direction 152.

Figure 17:
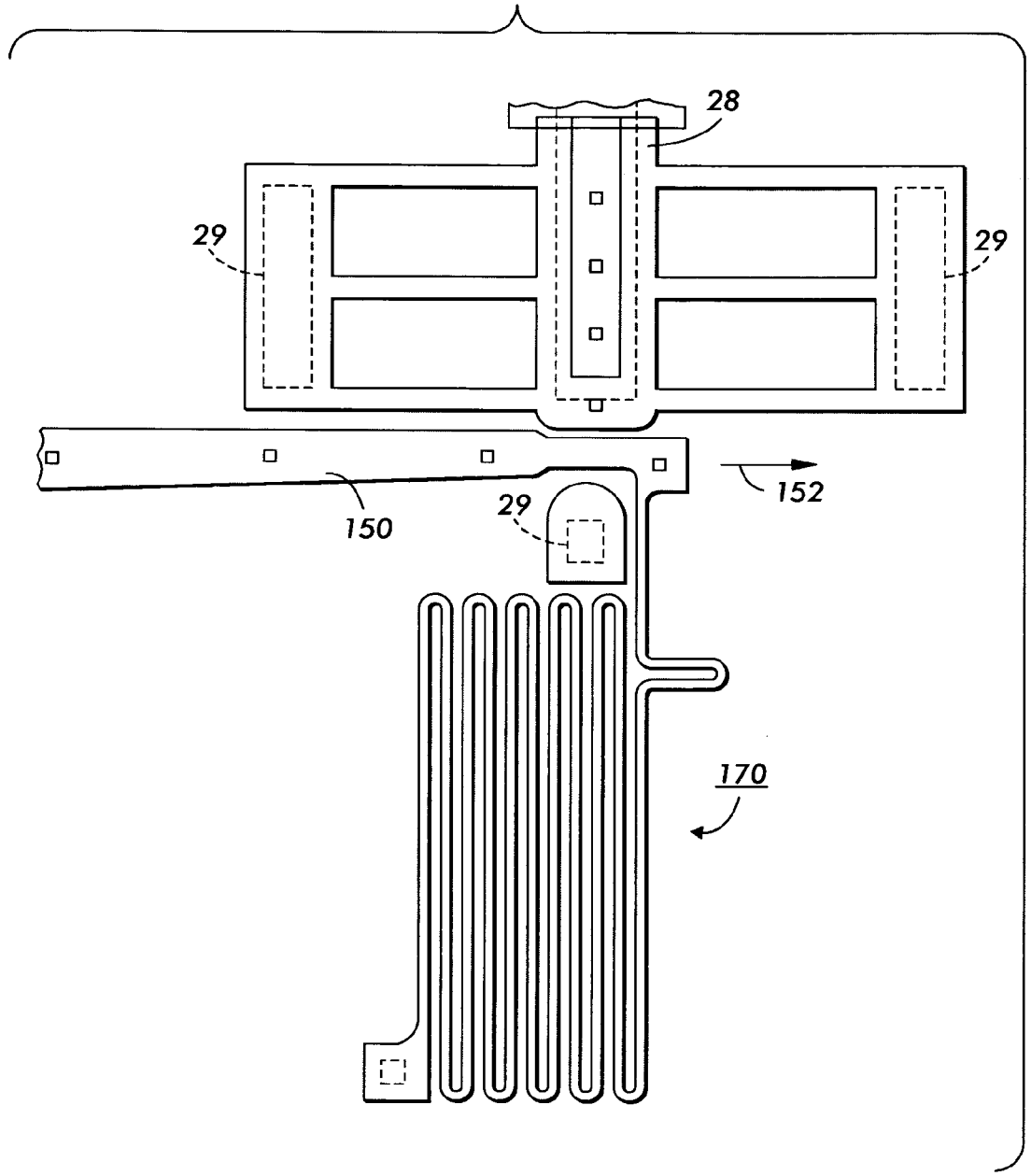
FIG. 17 is a more complete view of the wedge style actuator mechanism of FIG. 15 further employing a spring return.

FIG. 17 schematically depicts the arrangement of FIG. 15 as provided with a return spring 170 so as to counteract the force of a thermal actuator pushing the wedge block 150 in direction 152.

Figure 18:
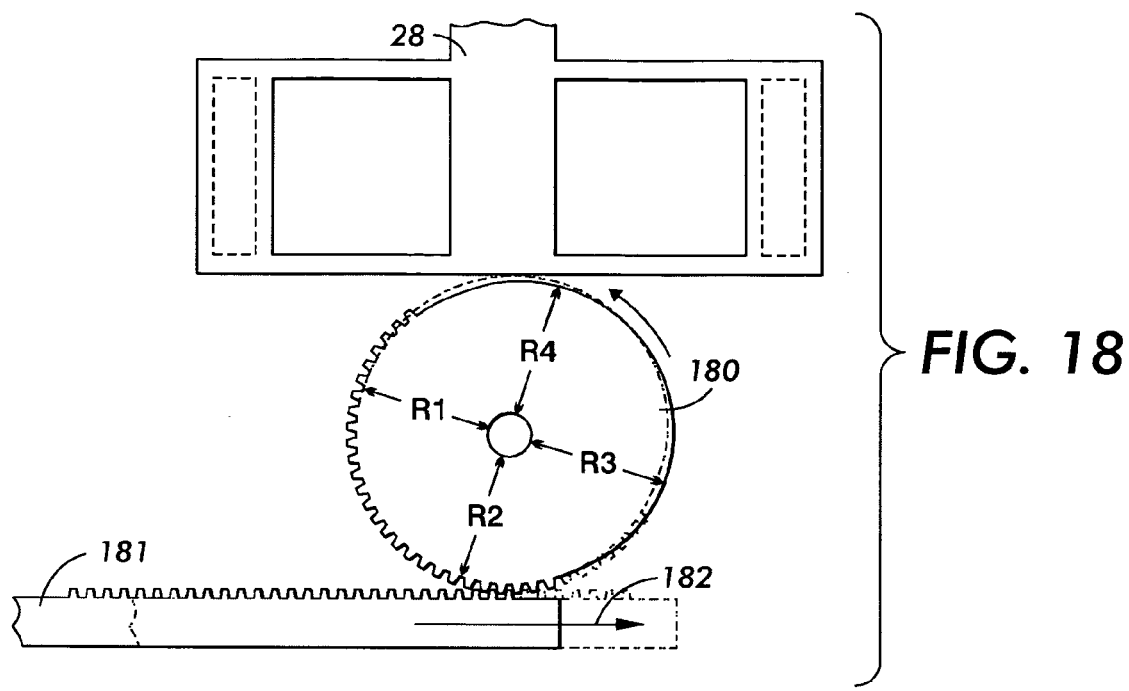
FIG. 18 depicts a gear tooth cam style actuator mechanism for micro-misalignment.
Figure 19:
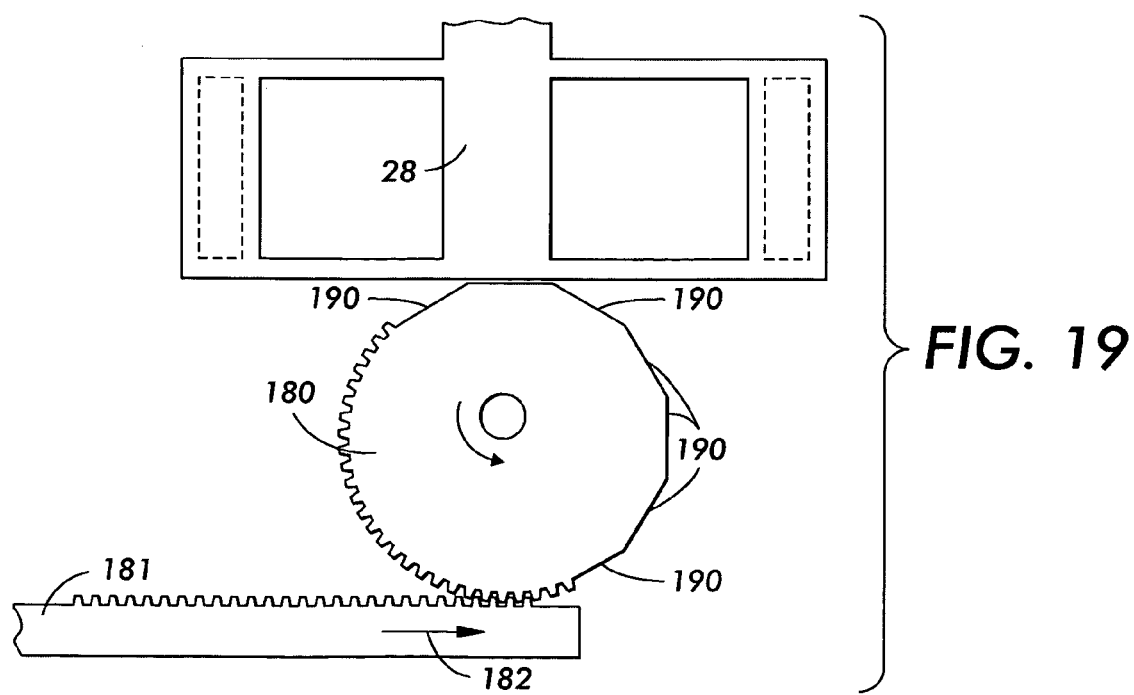
FIG. 19 depicts a gear tooth cam style actuator mechanism for micro-misalignment with step facets.

In FIG. 18 there is depicted yet a further alternative embodiment for micro-incremental misalignment. A gear toothed cam 180 is driven by a mated toothed drive bar 181 affixed to a thermal actuator and directionally driven as noted by arrow 182. To make the linkage 28 move incrementally, the cam 180 is anchored off the center where the radius R1 is the same as the radius R2, but the radius R3 is different than the radius R4 and the radius R1. FIG. 19 provides an alternative to the continuously variable embodiment of FIG. 18 by providing facets 190 which will give distinct discretely variable incremental values of misalignment.

Figure 20:
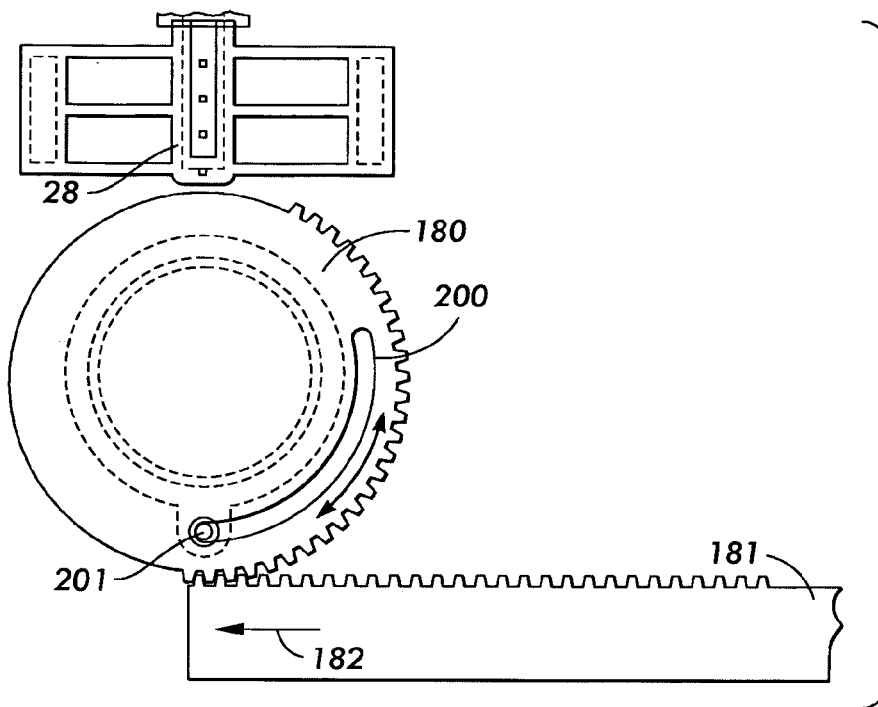
FIG. 20 depicts a gear tooth cam style actuator mechanism for micro-misalignment with a stop slot and pin.
Figure 21:
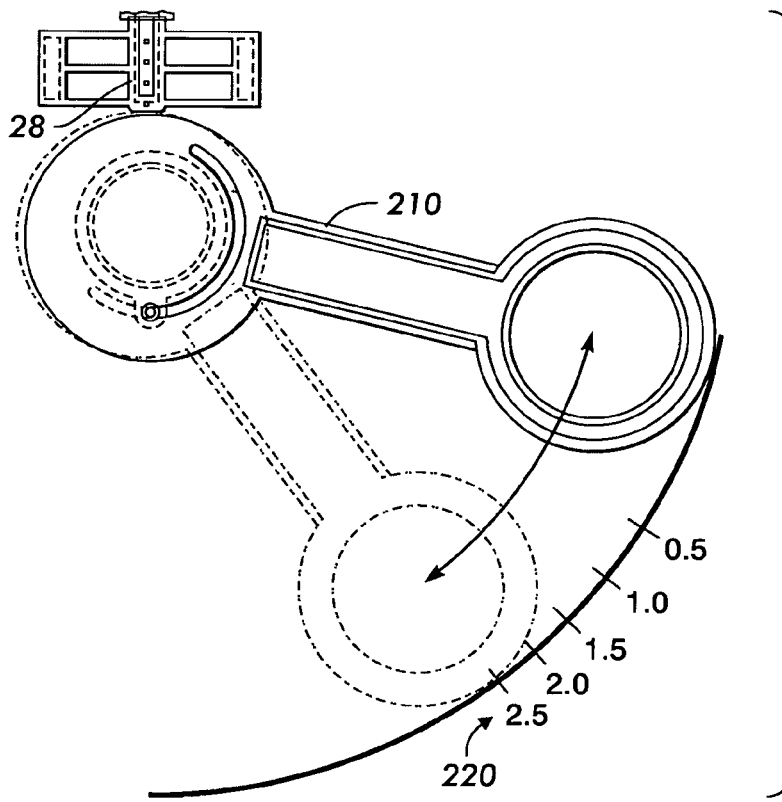
FIG. 21 depicts a lever rod cam style actuator mechanism for micro-misalignment.

FIG. 20 provides depiction of an embodiment essentially the same as that provided in FIGS. 18 and 19 but with the addition of a range limiting slot 200 and stop pin 201. FIG. 21 is much the same but the cam can be driven individually via connector rod 210 with readings 220 indicating the traveling distance of the linkage 28.

Figure 22:
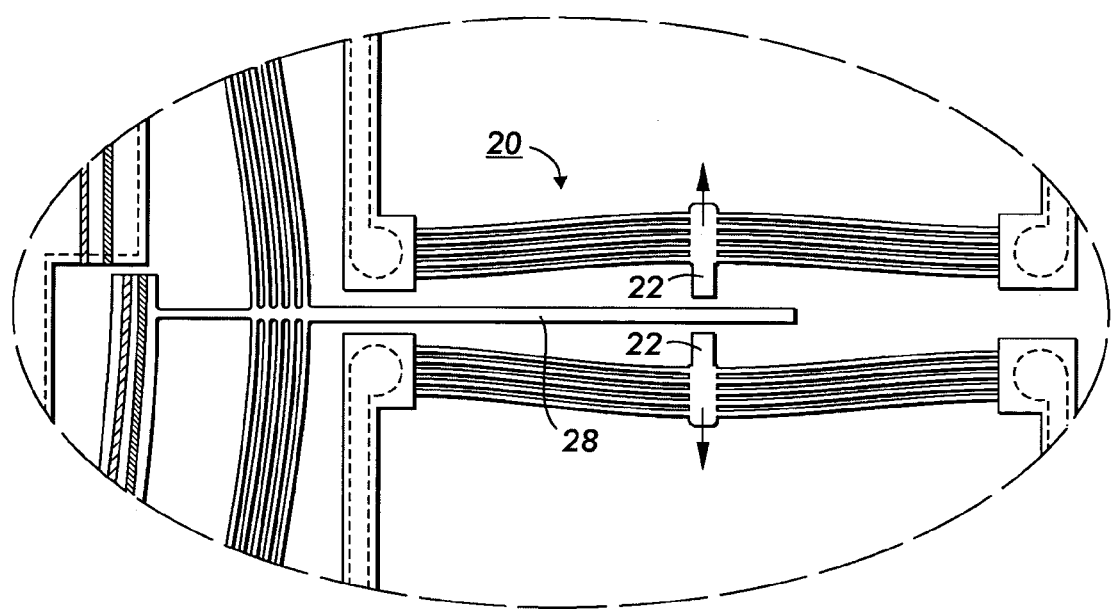
FIG. 22 shows an alternative embodiment arrangement relying upon friction.
Figure 23:
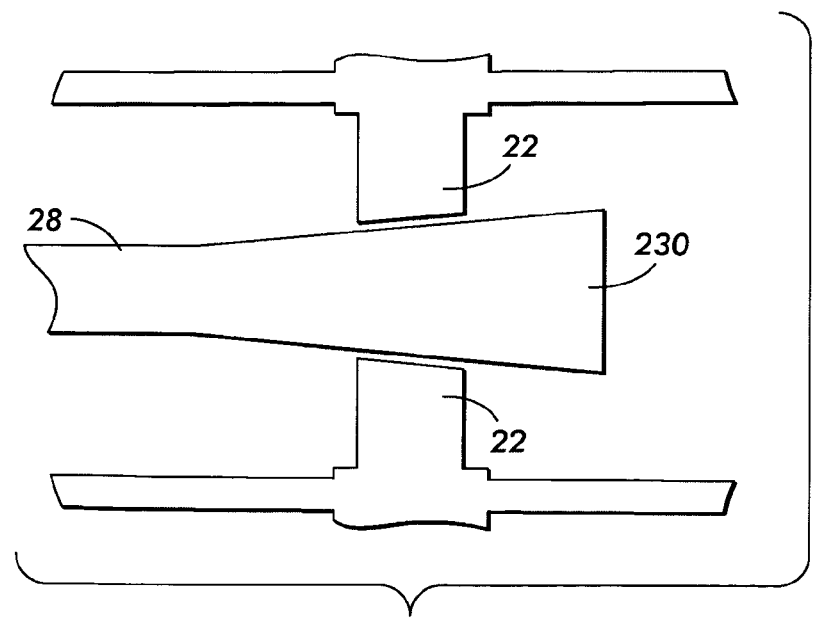
FIG. 23 depicts and adjunct to the embodiment of FIG. 22 when the coefficient of friction is insufficient.

As will be well understood by those skilled in the art, there are many ways in which to actuate and provide micro-incremental misalignment, and indeed in FIG. 22 there is depicted yet a further embodiment employable where sufficient coefficients of friction are provided. Here teeth 22 are brought to bear directly upon linkage 28. Typically the MEMS structures shown herein are made using deep reactive ion etching (DRIE) on single crystalline silicon or silicon on insulator (SOI) wafers. The etching gas can be $SF_6$, $C_4F_8$, $Cl_2$, or combination of these gases. For example, the chlorine etching can create vertical roughness (i.e. the roughness pattern is vertical to the wafer face), whereas Bosch process (using $SF_6$, $C_4F_8$) can create horizontal roughness. For these embodiments, a chlorine process is chosen to create vertical roughness for better friction force. In addition, the etchant gas concentration may be varied, as well as the etching temperatures and gas flow rates for optimized roughness so as to increase the friction coefficient and thereby enhance the tune-ability. FIG. 23 provides linkage 28 with a dovetail structure 230 that can enhance the clamping operation where the friction coefficient is insufficient.

The invention may be embodied in other specific forms without departing from its spirit or essential characteristics. The described embodiments are to be considered in all respect only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A micro-electro-mechanical variable optical attenuator, comprising:
   a micro-electro-mechanical fixed optical waveguide;
   a micro-electro-mechanical flexible cantilever beam optical waveguide which may be brought into substantial alignment with the fixed optical waveguide;
   a micro-electro-mechanical actuator micro-incrementally misaligning the flexible cantilever beam optical waveguide relative to the fixed optical waveguide; and
   a micro-electro-mechanical latch that will hold the flexible cantilever beam optical waveguide as micro-incrementally misaligned relative to the fixed optical waveguide by the actuator even in the absence of power, in a manner such that any optical signal passing through the fixed optical waveguide and flexible cantilever beam optical waveguide is attenuated.

2. The micro-electro-mechanical variable optical attenuator provided in claim 1, wherein the latch is provided with a plethora of latching teeth.

3. The micro-electro-mechanical variable optical attenuator provided in claim 1, wherein the latch is provided with latching teeth having stair-step mating faces.

4. The micro-electro-mechanical variable optical attenuator provided in claim 1, wherein the latch is provided with a wedge block.

5. The micro-electro-mechanical variable optical attenuator provided in claim 4, wherein the wedge block is provided with facets.

6. The micro-electro-mechanical variable optical attenuator provided in claim 4, further comprising a return spring.

7. The micro-electro-mechanical variable optical attenuator provided in claim 1, wherein the latch is provided with a cam.

8. The micro-electro-mechanical variable optical attenuator provided in claim 7, wherein the cam is provided with a range limiting slot.

9. The micro-electro-mechanical variable optical attenuator provided in claim 1, wherein the latch is provided with a cam having facets.

10. A micro-electro-mechanical variable optical attenuator, comprising:
    a single optical gap, the single optical gap further comprising a micro-electro-mechanical fixed optical waveguide, and a micro-electro-mechanical flexible cantilever beam optical waveguide, the flexible cantilever beam optical waveguide being capable of being switched into substantial alignment with the fixed optical waveguide;
    a micro-electro-mechanical actuator micro-incrementally misaligning the flexible cantilever beam optical waveguide relative to the fixed optical waveguide; and
    a micro-electro-mechanical latch that will hold the flexible cantilever beam optical waveguide as positionally micro-incrementally misaligned even in the absence of power, relative to the fixed optical waveguide by the actuator, in a manner such that any optical signal passing through the single optical gap is attenuated.

11. The micro-electro-mechanical variable optical attenuator provided in claim 10, wherein the latch is provided with a plethora of latching teeth.

12. The micro-electro-mechanical variable optical attenuator provided in claim 10, wherein the latch is provided with latching teeth having stair-step mating faces.

13. The micro-electro-mechanical variable optical attenuator provided in claim 10, wherein the latch is provided with a wedge block.

14. The micro-electro-mechanical variable optical attenuator provided in claim 13, wherein the wedge block is provided with facets.

15. The micro-electro-mechanical variable optical attenuator provided in claim 13, further comprising a return spring.

16. The micro-electro-mechanical variable optical attenuator provided in claim 10, wherein the latch is provided with a cam.

17. The micro-electro-mechanical variable optical attenuator provided in claim 16, wherein the cam is provided with a range limiting slot.

18. The micro-electro-mechanical variable optical attenuator provided in claim 10, wherein the latch is provided with a cam having facets.

19. A micro-electro-mechanical system optical switch with integral variable optical attenuator, comprising:
    two or more micro-electro-mechanical fixed optical waveguides;
    a micro-electro-mechanical flexible cantilever beam optical waveguide which may be switched into substantial alignment with any of the two or more fixed optical waveguides;
    a micro-electro-mechanical actuator for switching the movable optical waveguide to a selected one of the two or more fixed optical waveguides and further capable of micro-incrementally misaligning the movable optical waveguide relative to the selected one of the two or more fixed optical waveguides; and
    a micro-electro-mechanical latch that will hold the movable optical waveguide as micro-incrementally misaligned by me actuator, relative to the selected one of the two or more fixed optical waveguides even in the absence of power, in a manner such that any optical signal passing through the movable optical waveguide to the selected one of the two or more fixed optical waveguides is attenuated by some variably desired amount.

20. The micro-electro-mechanical system optical switch with integral variable optical attenuator provided in claim 19, wherein the latch is provided with a plethora of latching teeth.

21. The micro-electro-mechanical system optical switch with integral variable optical attenuator provided in claim 19, wherein the latch is provided with latching teeth having stair-step mating faces.

22. The micro-electro-mechanical system optical switch with integral variable optical attenuator provided in claim 19, wherein the latch is provided with a wedge block.

23. The micro-electro-mechanical system optical switch with integral variable optical attenuator provided in claim 22, wherein the wedge block is provided with facets.

24. The micro-electro-mechanical system optical switch with integral variable optical attenuator provided in claim 22, further comprising a return spring.

25. The micro-electro-mechanical system optical switch with integral variable optical attenuator provided in claim 19, wherein the latch is provided with a cam.

26. The micro-electro-mechanical system optical switch with integral variable optical attenuator provided in claim 25, wherein the cam is provided with a range limiting slot.

27. The micro-electro-mechanical system optical switch with integral variable optical attenuator provided in claim 19, wherein the latch is provided with a cam having facets.

\* \* \* \* \*